(12) United States Patent
Lee et al.

(10) Patent No.: US 9,288,097 B2
(45) Date of Patent: Mar. 15, 2016

(54) INTERFERENCE CANCELLATION SCHEME USING CONSTELLATION DIAGRAM

(71) Applicant: Samsung Electronics Co., Ltd., Gyeonggi-do (KR)

(72) Inventors: Heun-Chul Lee, Gyeonggi-do (KR); Jong-Han Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/619,861

(22) Filed: Feb. 11, 2015

(65) Prior Publication Data

US 2015/0229373 A1    Aug. 13, 2015

Related U.S. Application Data

(60) Provisional application No. 61/938,426, filed on Feb. 11, 2014, provisional application No. 61/971,954, filed on Mar. 28, 2014.

(30) Foreign Application Priority Data

Jun. 13, 2014 (KR) ........................ 10-2014-0071917

(51) Int. Cl.
*H04B 7/10* (2006.01)
*H04L 27/34* (2006.01)
*H04B 1/10* (2006.01)
*H04L 25/03* (2006.01)
*H04B 7/04* (2006.01)
*H04B 7/06* (2006.01)
*H04B 7/08* (2006.01)

(52) U.S. Cl.
CPC *H04L 27/34* (2013.01); *H04B 1/10* (2013.01); *H04B 7/0404* (2013.01); *H04B 7/0413* (2013.01); *H04B 7/063* (2013.01); *H04B 7/0639* (2013.01); *H04B 7/086* (2013.01); *H04L 25/03923* (2013.01)

(58) Field of Classification Search
CPC ........ H04B 1/10; H04B 7/0456; H04B 7/068; H04B 7/0842; H04B 7/086; H04B 7/0413; H04B 7/063; H04B 7/0693; H04B 7/0404; H04L 27/34; H04L 25/03923
See application file for complete search history.

(56) References Cited

U.S. PATENT DOCUMENTS

| | | | |
|---|---|---|---|
| 8,787,483 B1* | 7/2014 | Sun et al. | 375/267 |
| 2012/0250805 A1* | 10/2012 | Shin | 375/341 |
| 2013/0070813 A1* | 3/2013 | Kim | H04L 27/34 375/214 |
| 2013/0114437 A1* | 5/2013 | Yoo et al. | 370/252 |
| 2015/0003262 A1* | 1/2015 | Eder | H04B 7/0452 370/252 |

* cited by examiner

Primary Examiner — Syed Haider
(74) Attorney, Agent, or Firm — The Farrell Law Firm, P.C.

(57) ABSTRACT

Provided is an interference cancellation method by a User Equipment (UE) in a cellular communication system. The method includes receiving a signal including a desired signal and an interference signal from at least one base station; determining a universal constellation diagram based on at least one of a transmission parameter of the desired signal and a transmission parameter of the interference signal; blindly detecting an additional transmission parameter of the interference signal using the determined universal constellation diagram; and cancelling the interference signal from the received signal using the detected additional transmission parameter.

32 Claims, 11 Drawing Sheets

INTERFERENCE CANCELLATION SCHEME USING CONSTELLATION DIAGRAM

PRIORITY

This application claims priority under 35 U.S.C. §119(e) to U.S. Provisional Patent Application No. 61/938,426, filed in the United States Patent and Trademark Office on Feb. 11, 2014, and U.S. Provisional Patent Application No. 61/971,954, filed in the United States Patent and Trademark Office on Mar. 28, 2014, and under 35 U.S.C. §119(a) to Korean Patent Application No. 10-2014-0071917, filed in the Korean Intellectual Property Office on Jun. 13, 2014, the entire disclosure of each of which is incorporated herein by reference.

BACKGROUND OF THE INVENTION

1. Field of the Invention

The present disclosure relates generally to an interference cancellation scheme in a communication system, and more particularly, to an interference cancellation scheme using a universal constellation diagram in a User Equipment (UE).

2. Description of the Related Art

To improve coverage and spectral efficiency, a next-generation wireless communication system has been designed, which operates as a base station having an aggressive frequency reuse factor and a high density. In particular, the base station may apply (or employ) multiple access technologies to allow multiple UEs to share the same time-frequency resources. The multiple access technologies may include, for example, Spatial Division Multiple Access (SDMA), Orthogonal Frequency Division Multiple Access (OFDMA), Time Division Multiple Access (TDMA), Frequency Division Multiple Access (FDMA), Code Division Multiple Access (CDMA), and the like.

A UE may suffer capacity loss due to inter-cell interference or intra-cell interference. Specifically, while the UE may receive the desired signals from a serving cell, it may also receive undesired signals from the serving cell or an interfering cell. In order to improve cell-edge performance in interference-constrained scenarios, advanced technologies such as, for example, Coordinated MutiPoint (CoMP) transmission and enhanced Inter-Cell Interference Coordination (eICIC), have recently been embodied in the Long Term Evolution (LTE) standard.

Advanced interference cancellation technology, which is referred to as Network-Assisted Interference Cancellation and Suppression (NAICS), has been studied by the 3$^{rd}$ Generation Partnership Project (3GPP). Advanced interference aware signal detection has attracted attention during a recent study of the LTE-Advanced (LTE-A) system.

For example, a UE may cancel or remove interference signals from received signals. To this end, the UE may utilize interference information including a constellation diagram used for the interference signals. A point on the constellation diagram is called a constellation point, and a possible symbol that can be selected in a given modulation scheme may be expressed as a point on the complex plane.

The UE may know (or be aware of) an interference constellation diagram by receiving transmission parameters associated with the interference modulation scheme and order (or level) by blind detection, without the help of the network, or by signaling, with the help of the network. Specifically, a UE may perform interference cancellation through detection or network signaling, assuming that the UE has good knowledge of transmission parameters such as, for example, a Rank Indicator (RI), a Precoding Matrix Indicator (PMI), and a modulation level.

These interference parameters may vary depending on a frequency unit of one Resource Block (RB) and a time unit of one time unit (e.g., Transmission Time Interval (TTI) or slot). Thus, signaling of the RB and the time unit (e.g., TTI or slot) is required. However, it is difficult for a serving cell to dynamically signal the transmission parameters, such as the modulation scheme and the order, in units of, for example, slots or RBs.

Further, the dynamic signaling may cause a very large overhead. However, if the signaling is excluded or omitted, performance degradation and computational cost may be significant.

SUMMARY OF THE INVENTION

The present disclosure is designed to address at least the above-mentioned problems and/or disadvantages and to provide at least the advantages described below.

Accordingly, an aspect of the present disclosure is to provide a new interference cancellation scheme based on a universal constellation diagram, which is capable of performing interference cancellation without the knowledge of an interference modulation level.

Another aspect of the present disclosure is to provide a method and apparatus for a UE to cancel interference from a received signal, even though the UE does not know the interference modulation scheme and level.

Another aspect of the present disclosure is to provide a low-complexity detection algorithm in which a UE calculates an interference Rank Indicator (RI) and a Precoding Matrix Indicator (PMI), using a universal constellation diagram.

In accordance with an aspect of the present disclosure, a method is provided for a UE to cancel interference in a cellular communication system. The method includes receiving a signal including a desired signal and an interference signal from at least one base station; determining a universal constellation diagram based on at least one of a transmission parameter of the desired signal and a transmission parameter of the interference signal; blindly detecting an additional transmission parameter of the interference signal using the determined universal constellation diagram; and cancelling the interference signal from the received signal using the detected additional transmission parameter.

In accordance with another aspect of the present disclosure, a UE device that performs interference cancellation in a cellular communication system. The UE device is configured to receive a signal including a desired signal and an interference signal from at least one base station; determine a universal constellation diagram based on at least one of a transmission parameter of the desired signal and a transmission parameter of the interference signal; blindly detect an additional transmission parameter of the interference signal using the determined universal constellation diagram; and cancel the interference signal from the received signal using the detected additional transmission parameter.

In accordance with another aspect of the present disclosure, a method is provided for receiving a signal by a UE in a cellular communication system. The method includes receiving a signal including a first data stream and a second data stream from a base station through spatial multiplexing; determining a universal constellation diagram to be used as a constellation diagram of the second data stream based on a transmission parameter of the second data stream; and detecting the first data stream using the constellation diagram of the second data stream.

In accordance with another aspect of the present disclosure, a UE device is provided that receives a signal in a cellular communication system. The UE device is configured to receive a signal including a first data stream and a second data stream from a base station through spatial multiplexing; determine a universal constellation diagram to be used as a constellation diagram of the second data stream based on a transmission parameter of the second data stream; and detect the first data stream using the constellation diagram of the second data stream.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

Figure 1:
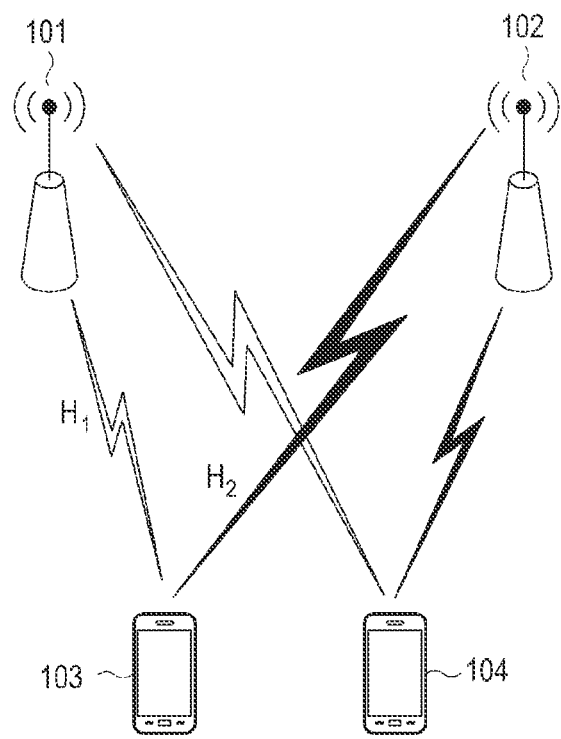
FIG. 1 illustrates inter-cell interference in a network.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The terms and words used in the following description and claims are not limited to their dictionary meanings, but, are merely used to enable a clear and consistent understanding of the disclosure. Accordingly, it should be apparent to those skilled in the art that the following description of exemplary embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Interpretable meanings of some terms used herein are presented below. However, it should be noted that the terms are not limited to examples of the interpretations presented below.

A base station, which is an entity communicating with a UE, may refer to a Base Station (BS), a Node B (NB), an enhanced Node B (eNB), an Access Point (AP), etc.

A user equipment, which is an entity communicating with a base station, may refer to a User Equipment (UE), a Mobile Station (MS), a Mobile Equipment (ME), a device, a terminal, etc.

Recently, in order to meet the strict requirements of International Telecommunication Union Radio communication sector (ITU-R), the next-generation cellular networks have been designed, such as LTE-A, which supports a wide bandwidth of a maximum of 100 MHz with higher-order spatial multiplexing and Carrier Aggregation (CA) for up to 8 layers and 4 layers in each of a Downlink (DL) and an Uplink (UL). However, what is more notable is that the spatial frequency reuse, in which more cells are used, may provide greater capacity gain, compared with one cell having the increased spatial order or spectral bandwidth. Therefore, a heterogeneous network that uses small cells in a macro cell environment has emerged as a sustainable development for the next-generation cellular networks.

While these heterogeneous networks may provide a variety of benefits, the cellular networks may also face unprecedented challenges. In particular, due to a large increase in the number of BSs, interference management has attracted great attention. For example, advanced co-channel interference aware signal detection has attracted the attention of researchers in the recent development process for the LTE-A systems.

Herein, the term 'co-channel interference' may refer to the interference that occurs due to different transmitters that use the same frequency band.

A work item, called NAICS, is now being studied for the LTE standard (e.g., LTE Release 12). This study has shown that NAICS can achieve significant performance improvements under the assumption that interference parameters are known to UEs through broadcasting or dedicated signaling, such as higher layer Radio-Resource Control (RRC) signaling or newly defined Downlink Control Information (DCI). However, this assumption is not always applied in the real systems, because the capacity of the backhaul supporting communication between BSs and the capacity of control channels from the BS to the UE are generally limited.

In fact, a similar inter-cell interference cancellation technology, known as Further eICIC (FeICIC), has been studied, which focuses on pilot signals (e.g., Cell-specific Reference Signals (CRSs). Because CRS Interference Cancellation (IC) technology uses semi-static interference parameters (e.g., Physical Cell Identity (PCID), CRS Antenna Ports (APs), and Multimedia Broadcast Multicast Service over Single Frequency Network (MBSFN) subframe configuration), the signaling overhead enabling FeICIC is more manageable.

However, unlike FeICIC, NAICS addresses (or manages) the interference in a data channel known as a Physical Downlink Shared Channel (PDSCH), and requires a knowledge of dynamic interference parameters such as a Rank Indicator (RI), a Precoding Matrix Indicator (PMI), and a modulation level.

In addition to the network signaling overhead caused by NAICS, a very short latency over the backhaul network is used to achieve real-time coordination between BSs. In order to solve the signaling overhead and latency problems, a UE may blindly estimate interference parameters based on the received signals.

For example, for blind detection for a modulation level of an interference signal, the UE may apply (or employ) a modulation classification method. The modulation classification method may apply Maximum-Likelihood (ML) estimation, and the ML estimation may include exhaustive search for all possible modulation levels. In the LTE system, possible modulation for downlink transmission may include 4QAM, 16QAM, and 64QAM.

Modulation detection for interference signals (i.e., interference modulation detection) should be performed in every Resource Block (RB) of all TTIs (or slots) for the following reasons. In particular, in LTE Orthogonal Frequency Division Multiple Access (OFDMA) systems, for the UEs that are scheduled at the same time, allocated modulations may vary from one RB to another RB in the frequency domain and from one TTI (or slot) to another TTI (or slot) in the time domain. Due to the inherent high complexity and time-frequency application granularity, interference modulation detection using the modulation classification method may grant the prohibitively high complexity to UEs.

In accordance with an embodiment of the present disclosure, an interference cancellation scheme is provided for performing interference cancellation without the knowledge of a modulation level of an interference signal (e.g., an interference modulation level).

For example, the technology of the present disclosure may use a universal constellation diagram that can be applied for interference cancellation regardless of the actual modulation levels used by the interferers.

The universal constellation diagram is designed to minimize the sum of the squares of the Euclidean distance from all possible QAM constellation diagrams. A Lloyd algorithm may be applied, which is used for quantization for numerically solving the Euclidean distance minimization problem.

FIG. 1 illustrates inter-cell interference in a network.

Referring to FIG. 1, in the network, BSs 101 and 102, each having $N_t$ transmit antennas, may transmit messages to desired UEs 103 and 104, each having $N_r$ receive antennas. In this case, a signal $H_2$ transmitted from the BS 102 of an interfering cell may act as an interference signal to the UE 103.

Figure 2:
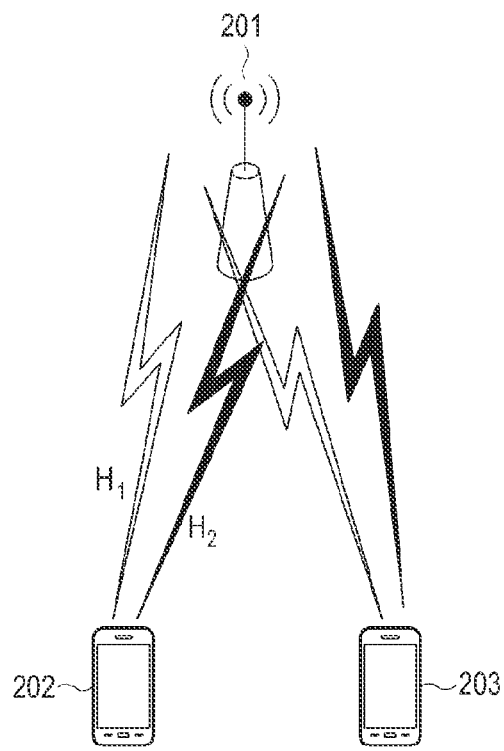
FIG. 2 illustrates intra-cell interference in a network structure.

FIG. 2 illustrates intra-cell interference in a network.

Referring to FIG. 2, in the network, BS 201, having $N_t$ transmit antennas may transmit messages to desired UEs 202 and 203, each having $N_r$ receive antennas. In this case, a signal $H_2$ that is transmitted from the BS 201 of the serving cell to another UE 203 may act as an interference signal to the UE 202.

In the present disclosure, a description will now be made of the case where a NAICS ML receiver is applied for inter-cell interference, as an example of an Interference Cancellation (IC) receiver that can be applied to a UE.

Figure 3:
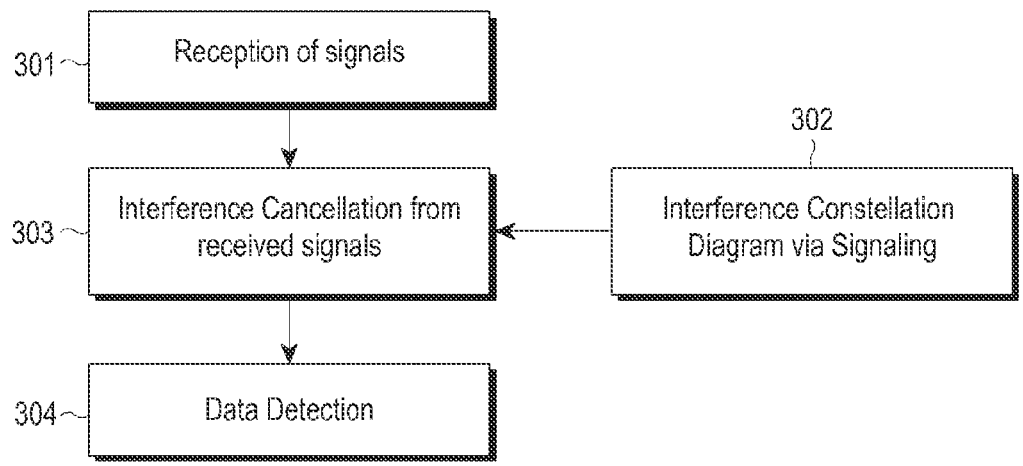
FIG. 3 illustrates an interference cancellation method by a UE according to an embodiment of the present disclosure.

FIG. 3 illustrates an interference cancellation method by a UE according to an embodiment of the present disclosure. Specifically, FIG. 3 illustrates an interference cancellation method by a UE, when transmission parameters RI and PMI and a modulation level are known by the UE through network signaling.

Referring to FIG. 3, in step 301, the UE receives a downlink signal, e.g., at least one of a Physical Downlink Shared Channel (PDSCH) and a Physical Multicast Channel (PMCH).

In step 302, the UE selectively acquires interference parameters RI and PMI through broadcasting or dedicated signaling such as higher layer RRC signaling or DCI, and determine an interference constellation diagram.

In step 303, the UE cancels an interference signal from the received signal using the determined interference constellation diagram in operation 303.

In step 304, the UE receives data.

Herein, inter-cell interference in a downlink Multiple Input Multiple Output (MIMO)-Orthogonal Frequency Division Multiple Access (OFDM) system will be considered, and it will be assumed that for the sake of brief indication, the UE has the knowledge of interference parameters (e.g., RI, PMI and modulation level) through signaling.

An $l_i$-dimensional complex signal vector that is transmitted from a BS_i in a k-th subcarrier is represented by $x_k^i = [x_k^{i,1}, \ldots, x_k^{i,l_i}]^T$, where $x_k^{i,l}$ represents an l-th spatial layer in a subcarrier k, $l_i$ represents the number RI of transmission layers, and $[\ ]^T$ represents a transpose of the vector.

A symbol $x_k^{i,l}$ may be selected from a constellation set $C^{I\ i}$ in which the cardinality is given by $|C^{i\ i}|$. The average transmit power of $x_k^{i,l}$ is assumed to be normalized to '1' (e.g., normalized to $E[|x_k^{i,l}|^2]=1$), where $E[\bullet]$ represents an expectation operator, and $|\bullet|$ represents the absolute value of a complex number. Without undermining the generality, a BS with i=S is a serving BS, and a BS with i=I is as an interfering BS. Further, it is assumed that all of the $l_i$ spatial layers use the same modulation level.

Herein, $r_k$ is a signal vector that is received by a desired UE in a subcarrier k. In this case, $r_k$ may be written as shown in Equation (1).

$$r_k = H_k^S x_k^S + H_k^I x_k^I + n_k, \text{for } k=1,2,\ldots,K, \quad (1)$$

In Equation (1), $H_k^i$ represents an effective channel matrix, which includes an actual channel matrix and a precoding matrix, and $n_k$ represents an additive noise vector. Elements of the vector correspond to an independently and identically distributed (i.i.d.) complex Gaussian of a variance $\sigma_n^2$. In addition, K represents the number of coded Resource Elements (REs) used for blind detection of interference parameters in each RB.

From the definition of NAICS, one purpose of the NAICS ML receiver herein is to obtain soft bit information for the serving data (e.g., desired data) of $x_k^S = [x_k^{S,1}, \ldots, x_k^{S,l_S}]$. An m-th bit, (m=1, 2, $\ldots$, $\log_2|C^{J,S}|$), of a constellation symbol $x_k^{S,l}$ is represented by $b_{k,l,m}^S$, and $L(b_{k,l,m}^S)$ represents a Log-Likelihood Ratio (LLR) for a bit $b_{k,l,m}^S$, where $L(b_{k,l,m}^S)$ is defined as shown in Equation (2).

$$L(b_{k,l,m}^S) = \log \frac{P(b_{k,l,m}^S = 1)}{P(b_{k,l,m}^S = 0)}, \quad (2)$$

In Equation (2), $P(b_{k,l,m}^S = b)$ represents the probability that a random variable $b_{k,l,m}^S$ will have b (b=0 or 1) as its value.

In addition, $p(r_k|x_k^S, x_k^I)$ represents a conditional probability density function (pdf) of $r_k$ on condition of serving data $x_k^S$ and interference data (e.g., undesired data) $x_k^I$, and is given by Equation (3).

$$p(r_k | x_k^S, x_k^I) = \frac{1}{(\pi \sigma_n^2)^{N_r}} \exp\left(-\frac{\|r_k - H_k^S x_k^S - H_k^I x_k^I\|^2}{\sigma_n^2}\right), \quad (3)$$

In this case, an LLR value of $b_{k,l,m}^S$ may be obtained using Equation (4).

$$L(b_{k,l,m}^S) = \log \frac{\sum_{x_k^S \in \chi_{\{1,l,m\}}^S} \sum_{x_k^I \in \chi^I} p(r_k | x_k^S, x_k^I)}{\sum_{x_k^S \in \chi_{\{0,l,m\}}^S} \sum_{x_k^I \in \chi^I} p(r_k | x_k^S, x_k^I)}, \quad (4)$$

In Equation (4), $\chi^I$ represents a set of all possible symbol vectors $x_k^i$, which is obtained as an $l_i$-fold Cartesian product of $C^{I,i}$, and $\chi_{\{b,l,m\}}^S$ represents a subset of $\chi^S$ with $$b_{k,l,m}^S = b_{(b=0 \text{ or } 1)} \cdot \frac{1}{(\pi \sigma_n^2)^{N_r}},$$

as shown in Equation (3) above, will be ignored herein below, since it is a constant.

Figure 4:
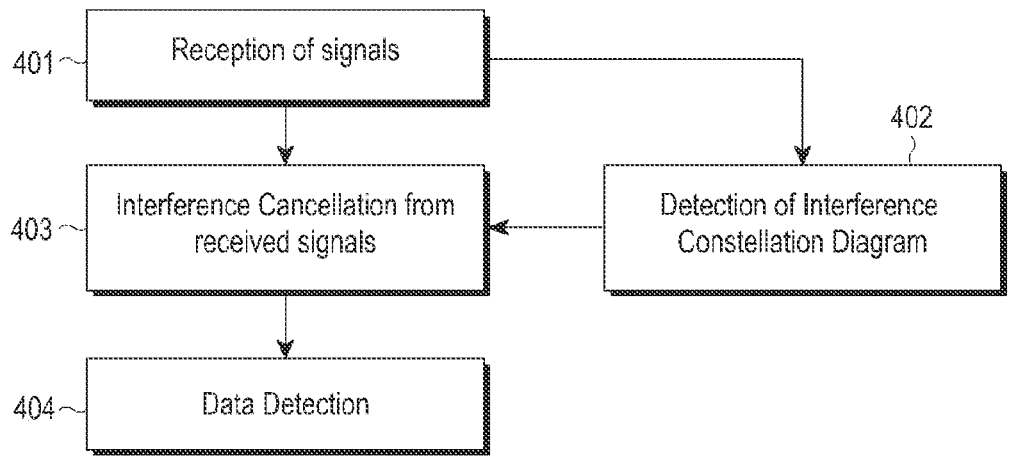
FIG. 4 illustrates an interference cancellation method by a UE according to an embodiment of the present disclosure.

Subsequently, a description will be made of a method of detecting interference modulation used for an interference constellation set $C^{I,I}$ using the modulation classification method, assuming that a UE knows (or is aware of) an RI and a PMI. FIG. 4 illustrates an interference cancellation method by a UE according to an embodiment of the present disclosure. Specifically, FIG. 4 illustrates an interference cancellation method by a UE when transmission parameters RI and PMI are already known or when the RI and PMI information is not required.

Referring to FIG. 4, in step 401, the UE receives a downlink signal.

In step 402, the UE selectively detects an interference constellation diagram (that is not signaled). It will be apparent to those of ordinary skill in the art that the UE may acquire interference parameters RI and PMI through broadcasting or dedicated signaling such as higher layer RRC signaling or DCI, if the interference parameters RI and PMI are required. For example, if the UE receives a PDCCH in step 401, information about the transmission parameters RI and PMI is not required, and the modulation level may be limited only to 4QAM.

In step 403, the UE cancels an interference signal from the received signal using the detected interference constellation diagram.

In step 404, the UE receives data.

Figure 5:
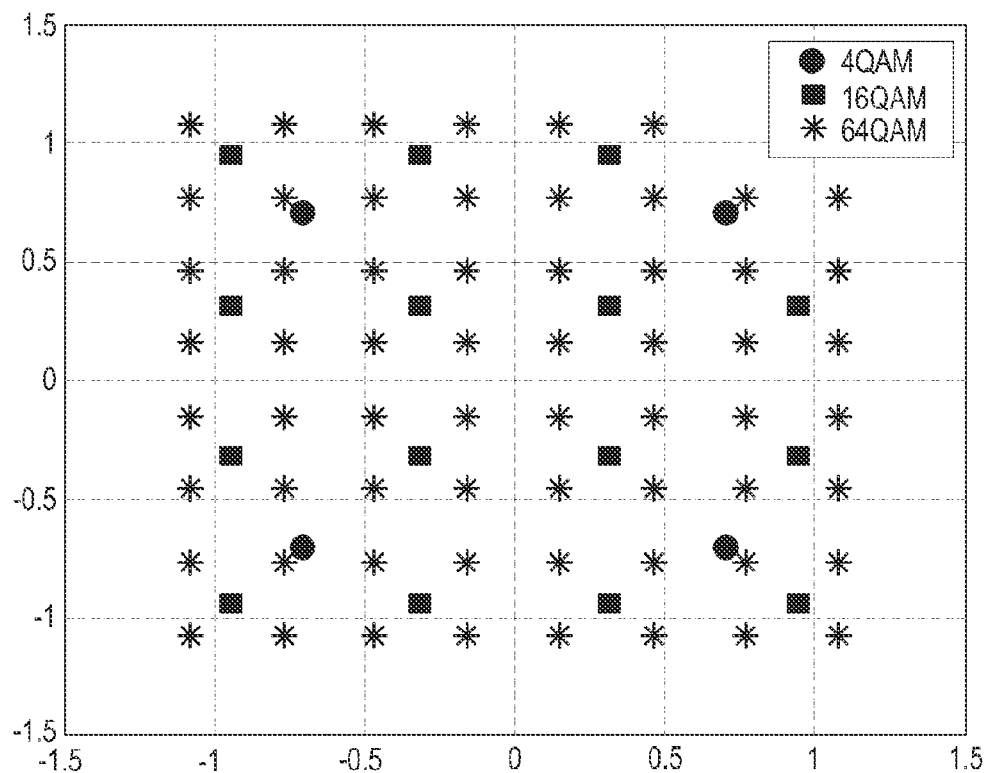
FIG. 5 illustrates constellation diagrams of 4-ary Quadrature Amplitude Modulation (QAM), 16QAM and 64QAM used in an LTE downlink according to an embodiment of the present disclosure.

The detection method of the interference constellation diagram will be described in more detail. FIG. 5 illustrates constellation diagrams of 4QAM, 16QAM and 64QAM used in an LTE downlink according to an embodiment of the present disclosure.

The 4QAM, 16QAM, and 64QAM modulations may be represented by $Q_4$, $Q_{q\_16}$ and $Q_{q\_64}$ (●, ■, and *), respectively. Constellation points on each LTE constellation diagram may be normalized to have a unit variance.

In the LTE system, a modulation level of a serving constellation may be implicitly determined by reading a DCI transmitted from a serving BS. However, for an interference constellation $C^{I,I}$, the UE may not use any information.

For an unknown interference modulation $C^{I,I}$, the prior probability of each modulation level q (for $q \in \{4, 16, 64\}$) and the prior probability of each constellation point $c_q^j$, $j \in \{1, \ldots, q\}$ associated with a given modulation level q, may be represented by $p_q$ and $p_q^j$, respectively.

It is assumed in this embodiment that the NAICS ML receiver performs symbol-level interference cancellation without prior information about interference signal. Therefore, it is also assumed that modulations and constellation points have the same probability. That is, it is assumed that $$p_q = \frac{1}{3}$$

(the three 4QAM, 16QAM and 64QAM modulations each have the same probability) and $$p_q^j = \frac{1}{q}.$$

(q constellation points each have the same probability), where q=4, 16, or 64. If other system parameters are given, modulation classification based on ML estimation minimizes the error probability.

Using the conditional pdf in Equation (3), the best ML decision metric for modulation q may be expressed as shown in Equation (5).

$$M_q = \prod_{k=1}^{K} \frac{1}{|\chi^S|} \sum_{x_k^S \in \chi^S} \frac{1}{|\chi_q^I|} \sum_{x_k^I \in \chi_q^I} p(r_k | x_k^S, x_k^I), \quad (5)$$

In Equation (5), $\chi_q^I$ corresponds to $\chi^I$ that is obtained as $C^{I,I} = Q_q$.

Therefore, an ML detector may discover the maximum value q (or a modulation level) of the metric for all possible values as shown in Equation (6).

$$q^{opt} = \arg\max_{q \in \{4,16,64\}} \mathcal{M}_q. \quad (6)$$

Equation (5) and Equation (6) show that modulation detection of $C^{I\,I}$, which is a similar method to the ML detection of $x_k^S$ given by Equation (4), includes exhaustive detection for all possible combinations between two vectors $x_k^S$ and $x_k^I$, meaning that the modulation detection performance can be improved by using REs that know $x_k^S$. If a CRS RE corresponds to this example and interference CRS REs do not collide with serving CRS REs, an ML metric as shown in Equation (7) is given.

$$\mathcal{M}_q = \prod_{k=1}^{K_{crs}} \frac{1}{|\chi^I|} \sum_{x_k^I \in \chi_q^I} p(r_k \mid S_k^S, x_k^I), \quad (7)$$

In Equation (7), $K_{crs}$ represents the number of CRS REs among a total of K REs, and $S_k^S$ represents a CRS symbol that is transmitted in a k-th CRS RE of the serving cell. An important secondary advantage is that a significant reduction in complexity may be achieved, as can be seen by comparing Equation (5) with Equation (7).

Equation (5) shows that the optimal ML detector should calculate an ML metric for all possible vectors of $x_k^S$ and $x_k^I$ having the complexity of $\mathcal{O}(q^{(l_S+l_I)})$, and the computational complexity may be prohibitively high to the UE.

Alternatively, two second-best approaches are provided herein for reducing the computational complexity.

A first approach is to apply the max-log approximation to Equation (5) in order to avoid calculation of the sum and multiplication for the exponential functions in Equation (5). In this case, the decision metric $\mathcal{M}_q$ may be expressed as shown in Equations (8) and (9) below.

$$\mathcal{M}_q \approx \sum_{k=1}^{K} \left( -\frac{1}{\sigma_n^2} \|r_k - H_k^S \hat{x}_k^S - H_k^I \hat{x}_k^I\|^2 \right) - K\ln(|\chi^S\|\chi_q^I|), \quad (8)$$

$$(\hat{x}_k^S, \hat{x}_k^I) = \arg\min_{x_k^S \in \chi^S, x_k^I \in \chi_q^I} \|r_k - H_k^S x_k^S - H_k^I x_k^I\|^2. \quad (9)$$

A second approach for additional reduction of the complexity is to apply a linear filter that suppresses desired signals from the signals, which were received prior to the modulation detection. For example, a whitening filter matrix represented by $W_k$ may be used. From the definition of a whitening filter, $W_k$ satisfying $E[\bar{n}_k \bar{n}_k^H] = W_k(H_k^S(H_k^S)^H + \sigma_n^2 I_{N_r})W_k^H = I_{N_r}$ may be applied to the filtered output.

The filtered output may be expressed as shown in Equation (10).

$$z_k = W_k r_k = \bar{H}_k^I x_k^I + \bar{n}_k, \quad (10)$$

In Equation (10), $\bar{H}_k^I = W_k H_k^I$ and $\bar{n}_k = W_k(H_k^S x_k^S + n_k)$.

After the whitening filter, a filter output $Z_k$ may be seen as a received signal vector of the single-user MIMO systems. Therefore, the simplest max-log metric may be given as shown in Equations (11) and (12).

$$\mathcal{M}_q \approx \sum_{k=1}^{K} \left( -\|z_k - \bar{H}_k^I \hat{x}_k^I\|^2 \right) - K\ln(|\chi_q^I|), \quad (11)$$

$$\hat{x}_k^I = \arg\min_{x_k^I \in \chi_q^I} \|z_k - \bar{H}_k^I x_k^I\|^2. \quad (12)$$

The foregoing interference cancellation schemes require the knowledge of interference modulation, for the interference cancellation. Hereinafter, in accordance with an embodiment of the present disclosure, a new interference cancellation scheme will be described that performs interference cancellation without the knowledge of the interference modulation.

Figure 6:
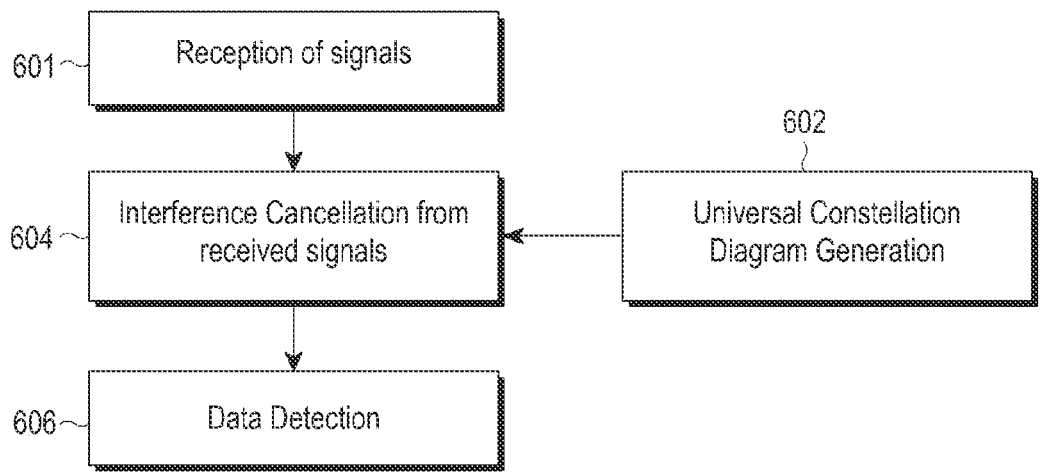
FIG. 6 illustrates a method of cancelling interference from received signals using a universal constellation diagram without the knowledge of the interference modulation, according to an embodiment of the present disclosure.

FIG. 6 illustrates a method of cancelling interference from received signals using a universal constellation diagram, without the knowledge of the interference modulation, according to an embodiment of the present disclosure. Specifically, FIG. 6 illustrates a method of cancelling interference from received signals using a universal constellation diagram, without the knowledge of the interference modulation, when only the transmission parameters RI and PMI are known, or in the transmission/reception environment where the RI and PMI information is not required.

Referring to FIG. 6, in step 601, the UE receives a downlink signal.

In step 602, the UE selectively generates a universal constellation diagram, or determines a universal constellation diagram to be used among the predefined universal constellation diagrams. If the interference parameters RI and PMI are required, the UE may acquire the interference parameters RI and PMI through broadcasting or dedicated signaling such as higher layer RRC signaling or DCI.

In step 604, the UE cancels the interference signal from the received signal using the universal constellation diagram.

In step 606, the UE receives data.

Specifically, the method of performing interference cancellation without the knowledge of the interference modulation may be achieved by using the fixed set of $\chi^i$ that is obtained based on the universal constellation diagram, for LLR calculation of Equation (4), regardless of the actual modulation levels which are used for interference signals.

As described above, a constellation diagram is designed for minimizing the sum of the squares of the Euclidean distance from all possible QAM constellation diagrams. To this end, the Lloyd algorithm may be used for quantization to numerically solve the Euclidean distance minimization problem.

The universal constellation diagram is represented by $\mathbb{U}$. Considering the LTE constellation diagrams $Q_{q\,1}$, $Q_{q\,16}$ and $Q_{q\,64}$ illustrated in FIG. 5, a universal constellation diagram $\mathbb{U} = \{c_u^1, c_u^2, \ldots, c_u^D\}$ is designed herein for minimizing the sum of the squares of the Euclidean distance from $Q_{q\,4}$, $Q_{q\,16}$ and $Q_{q\,64}$ given by Equation (13).

$$\hat{\mathbb{U}} = \arg\min_{\mathbb{U}} \sum_{q \in \{4,16,64\}} p_q D(\mathbb{U}, \mathbb{Q}_q), \quad (13)$$

In Equation (13), the squares of the Euclidean distance between $\mathbb{U}$ and $Q_{q\,q}$ may be defined as shown in Equation (14).

$$D(\mathbb{U}, \mathbb{Q}_q) = \sum_{c_q^j \in \mathbb{Q}_q} p_q^j \|c_q^j - \mathcal{Q}_u(c_q^j)\|^2. \quad (14)$$

In Equation (14), $\mathcal{Q}_u(c_q^j)$ represents a constellation point $c_u^d$, $c_u^d \in U$ with $\|c_q^j - \mathcal{Q}_u(c_q^j)\|^2 \leq \|c_q^j - c_u^d\|^2$, for an arbitrary Euclidean distance d (for $1 \leq d \leq D$) which is closest to $c_q^j$.

Equation (14) may be rewritten as shown in Equation (15).

$$\hat{\mathbb{U}} = \underset{\mathbb{U}}{\operatorname{argmin}} \sum_{d=1}^{D} \sum_{c_q^j \in S_d} p_q^j \|c_q^j - c_u^d\|^2, \quad (15)$$

In Equation (15), a cluster $S_d$ for $c_u^d$ is defined as $S_d = \{c_q^j \in Q_{q\ 4}, Q_{q\ 16} \text{ or } Q_{q\ 64} | \mathcal{Q}_u(c_q^j) = c_u^d\}$.

The problem given by Equation (15) may not be explicitly solved, and the iterative refinement technique, called a Lloyd algorithm, may be applied to numerically solve the problem. The problem by Equation (15) may be called a k-means clustering problem, and a two-step iterative algorithm described herein may be called a k-means clustering algorithm.

For example, a interference cancellation scheme in accordance with an embodiment of the present disclosure may select N constellation points from the constellation diagrams $Q_{q\ 4}$, $Q_{q\ 16}$ and $Q_{q\ 61}$ to generate a sample set $Q_{q\ s} = \{c_s^1, c_s^2, \ldots, c_s^N\}$ having the same probability as the prior probabilities (e.g., $p_q$ and $p_q^j$). If an initial universal constellation diagram $U^{(t)} = \{c_u^{1(t)}, c_u^{2(t)}, \ldots c_u^{D(t)}\}$ is given, the iterative algorithm may include the following two steps.

The first step is a clustering step, which divides N constellation points $c_s^n$ of $Q_{q\ s}$ into new clusters $S_d^{(t)}$ such as $S_d^{(t)} = \{c_s^n \in Q_{q\ s}: \mathcal{Q}_u(c_s^n) = c_u^d\}$.

The second step is an update step, which calculates a new universal constellation diagram $U^{(t+1)}$. Elements $c_u^{d(t+1)}$ of the universal constellation diagram may be obtained as $$c_u^{d(t+1)} = \frac{1}{|S_d^{(t)}|} \sum_{c_s^n \in S_d^{(t)}} c_s^n.$$

Although 2-dimensional (2D) Lloyd algorithms for 2D LTE modulation algorithms have been described so far, 1-dimensional (1D) Lloyd algorithms may be easily derived because 4QAM, 16QAM and 64QAM may be seen as Cartesian products of 2-ary Pulse-Amplitude Modulation (2PAM), 4PAM, and 8PAM, respectively.

Figure 7:
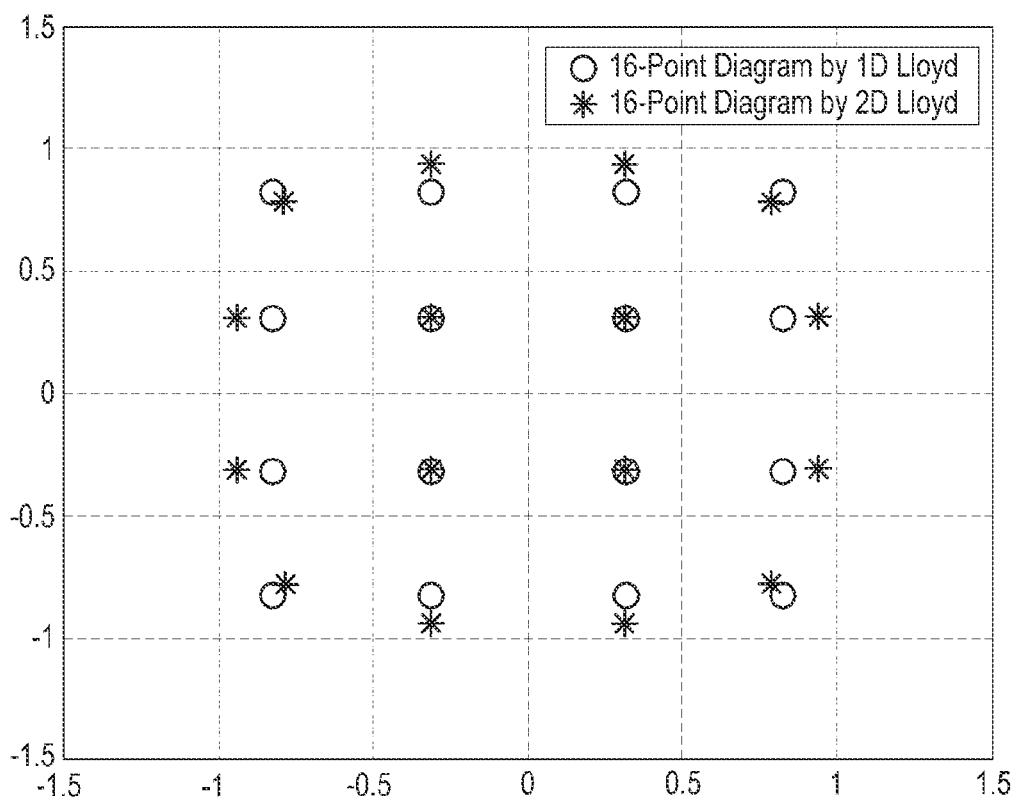
FIG. 7 illustrates 16-point constellation diagrams generated by 1D and 2D Lloyd algorithms according to an embodiment of the present disclosure.

FIG. 7 illustrates 16-point constellation diagrams generated by 1D and 2D Lloyd algorithms according to an embodiment of the present disclosure. Specifically, FIG. 7 illustrates two examples of universal constellation diagrams U with the cardinality of |U|=16, which are generated by 1D and 2D Lloyd algorithms.

In accordance with an embodiment of the present disclosure, a simpler and more heuristic approach to configure a universal constellation diagram is provided. In one example, constellation points are selected from a pool of conventional constellation diagrams including QAM, PAM, and Phase Shift Keying (PSK) modulations, and in another example, a universal diagram is configured while slightly distorting or deviating constellation points in the pool of the conventional constellation diagrams.

Figure 8:
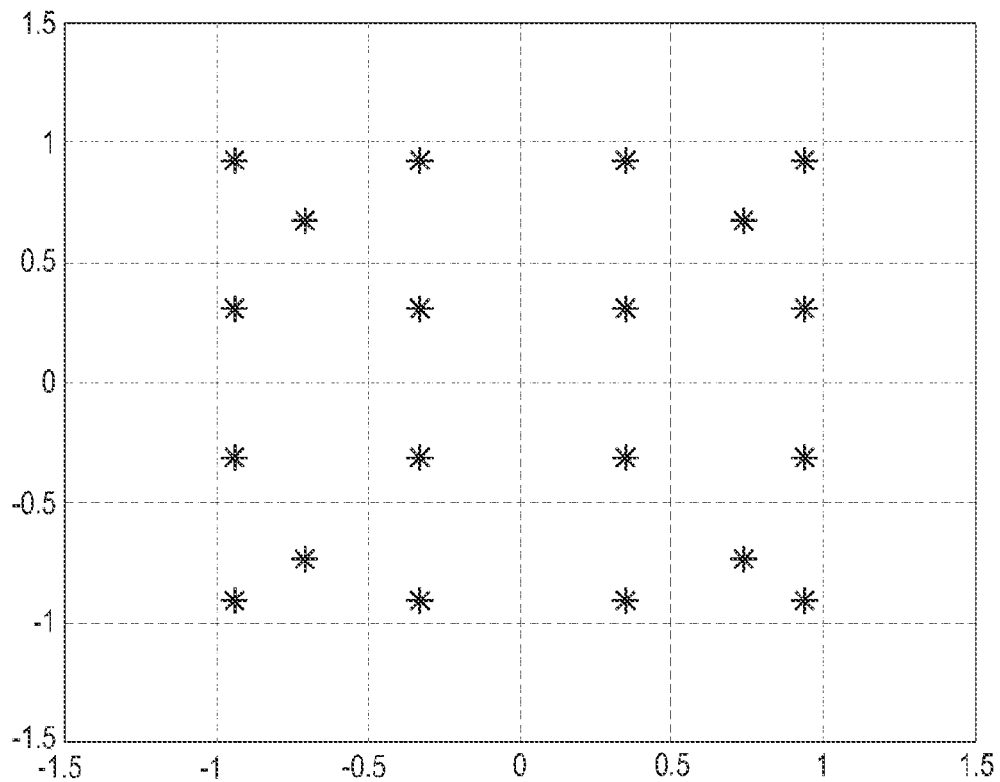
FIG. 8 illustrates an example of a 20-point universal constellation diagram selected from the conventional 4QAM and 16QAM.

FIG. 8 illustrates an example of a 20-point universal constellation diagram selected from the conventional 4QAM and 16QAM.

Referring to FIG. 8, the 20 constellation points include 4 points on the conventional 4QAM constellation diagram and 16 points on the conventional 16QAM constellation diagram.

Figure 9:
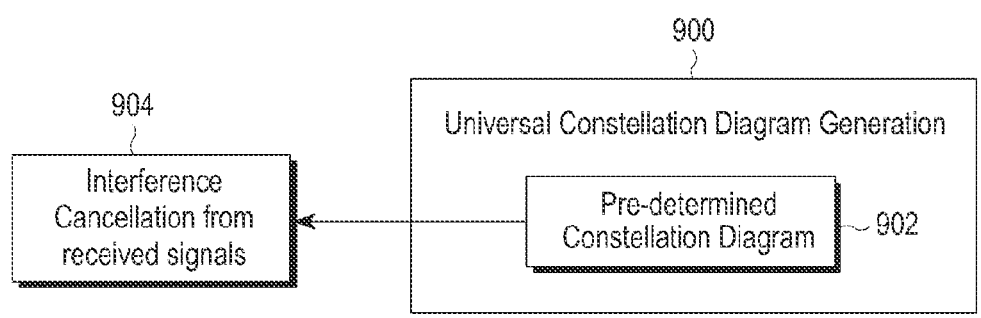
FIG. 9 illustrates an example of an interference cancellation method using a universal constellation diagram according to an embodiment of the present disclosure.

FIG. 9 illustrates an example of an interference cancellation method using a universal constellation diagram according to an embodiment of the present disclosure.

Referring to FIG. 9, in step 900, a UE generates a universal constellation diagram using a predefined constellation diagram 902, rather than an operation of actually generating the universal constellation diagram.

In step 904, the UE perform interference cancellation from the received signal using the predefined universal constellation diagram.

Figure 10:
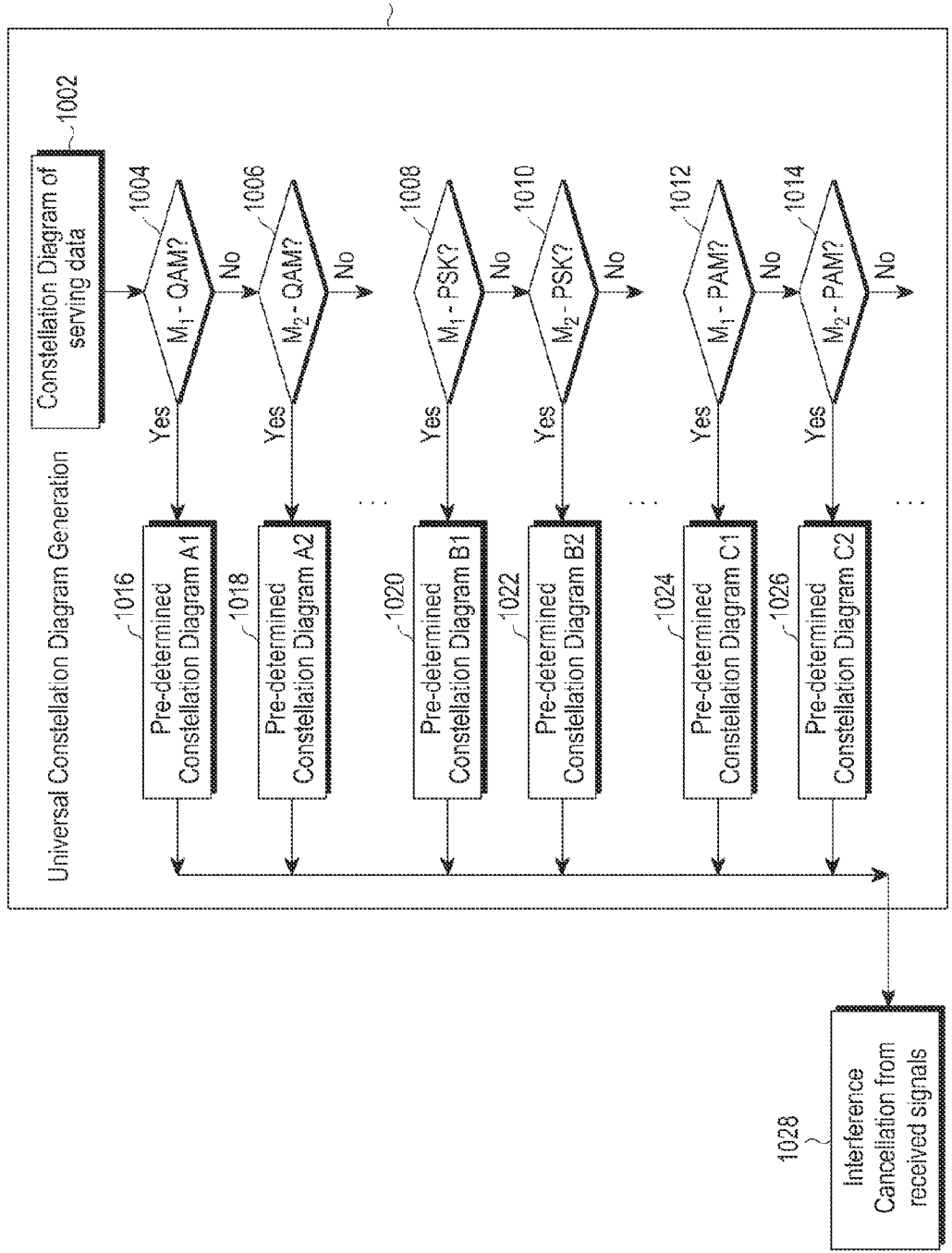
FIG. 10 illustrates an example of an interference cancellation method using a universal constellation diagram according to an embodiment of the present disclosure.

FIG. 10 illustrates an example of an interference cancellation method using a universal constellation diagram according to an embodiment of the present disclosure.

Referring to FIG. 10, a UE generates a universal constellation diagram, in step 1000 by determining a universal constellation diagram to be used among a plurality of predefined constellation diagrams, rather than an operation of actually generating the universal constellation diagram.

Specifically, in step 1002, the UE determines a constellation diagram of the serving data, to determine a modulation scheme and a modulation level of the serving data. In steps 1004-1014, the UE checks a modulation scheme and a modulation level of the serving data. In steps 1016-1026, the UE determines a universal constellation diagram for interference cancellation.

More specifically, the UE determines a universal constellation diagram to be used among the predefined constellation diagrams 1016, 1018, 1020, 1022, 1024, and 1026, by performing at least one of (i) checking modulation levels $M_1$, $M_2$, ... in steps 1004 and 1006, when the modulation scheme of the serving data is QAM, (ii) checking modulation levels $M_1$, $M_2$, ... in steps 1008 and 1010, when the modulation scheme of the serving data is PSK, and (iii) checking modulation levels $M_1$, $M_2$, ... in steps 1012 and 1014, when the modulation scheme of the serving data is PAM. In steps 1028, the UE performs interference cancellation from the received signal using the determined universal constellation diagram. In this case, for example, $M_1$ in step 1004 may have a value of 4, and $M_2$ in step 1006 may have a value of 16.

Figure 11:
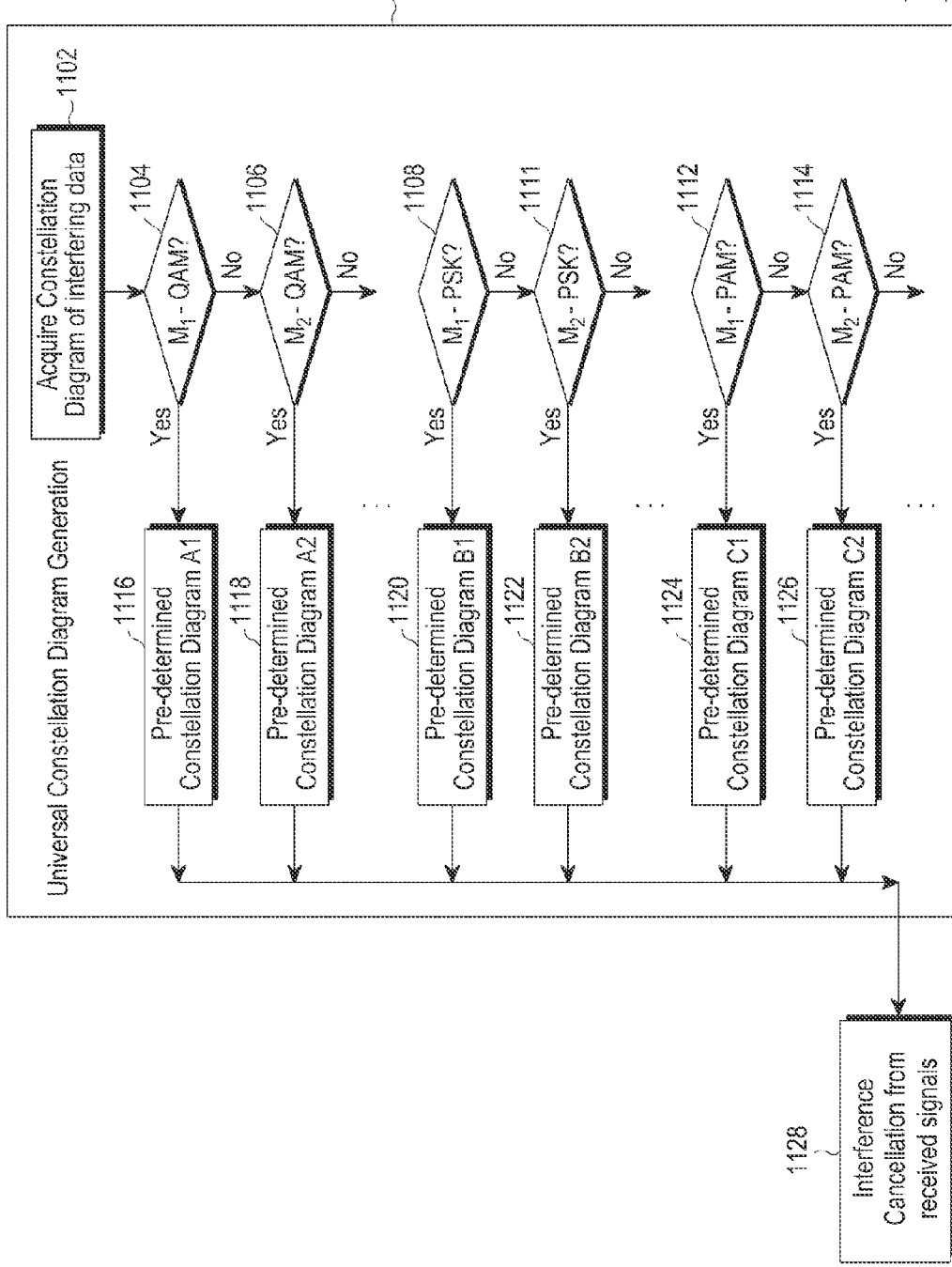
FIG. 11 illustrates an example of an interference cancellation method using a universal constellation diagram according to an embodiment of the present disclosure.

FIG. 11 illustrates an example of an interference cancellation method using a universal constellation diagram according to an embodiment of the present disclosure.

Referring to FIGS. 9 and 11, the operation 900 of FIG. 9, in which a UE generates a universal constellation diagram, may be an operation 1100 of FIG. 11 which determines a universal constellation diagram to be used among a plurality of predefined constellation diagrams, rather than an operation of actually generating the universal constellation diagram.

Specifically, the UE determines a constellation diagram of the interference data (or the interfering data) in step 1102, to determine a modulation scheme and a modulation level of the interference data. The constellation diagram of the interference data may be acquired by blind detection or through separate signaling. In steps 1104-1114, the UE checks the determined modulation scheme and modulation level of the interference data, and in steps 1116-1126, the UE determines a universal constellation diagram for interference cancellation.

More specifically, the UE determines a universal constellation diagram to be used among the predefined constellation diagrams 1116, 1118, 1120, 1122, 1124 and 1126, by performing at least one of (i) checking modulation levels $M_1$, $M_2$, ... in steps 1104 and 1106, when the modulation scheme of the interference data is QAM, (ii) checking modulation levels $M_1$, $M_2$, ... in steps 1108 and 1110, when the modulation scheme of the interference data is PSK, and (iii) checking modulation levels $M_1$, $M_2$, ... in steps 1112 and 1114, when the modulation scheme of the interference data is PAM. In step 1128, the UE performs interference cancellation from the received signal using the determined universal constellation diagram. In FIG. 11, for example, $M_1$ in step 1104 may have a value of 4, and $M_2$ in step 1106 may have a value of 16.

Figure 12:
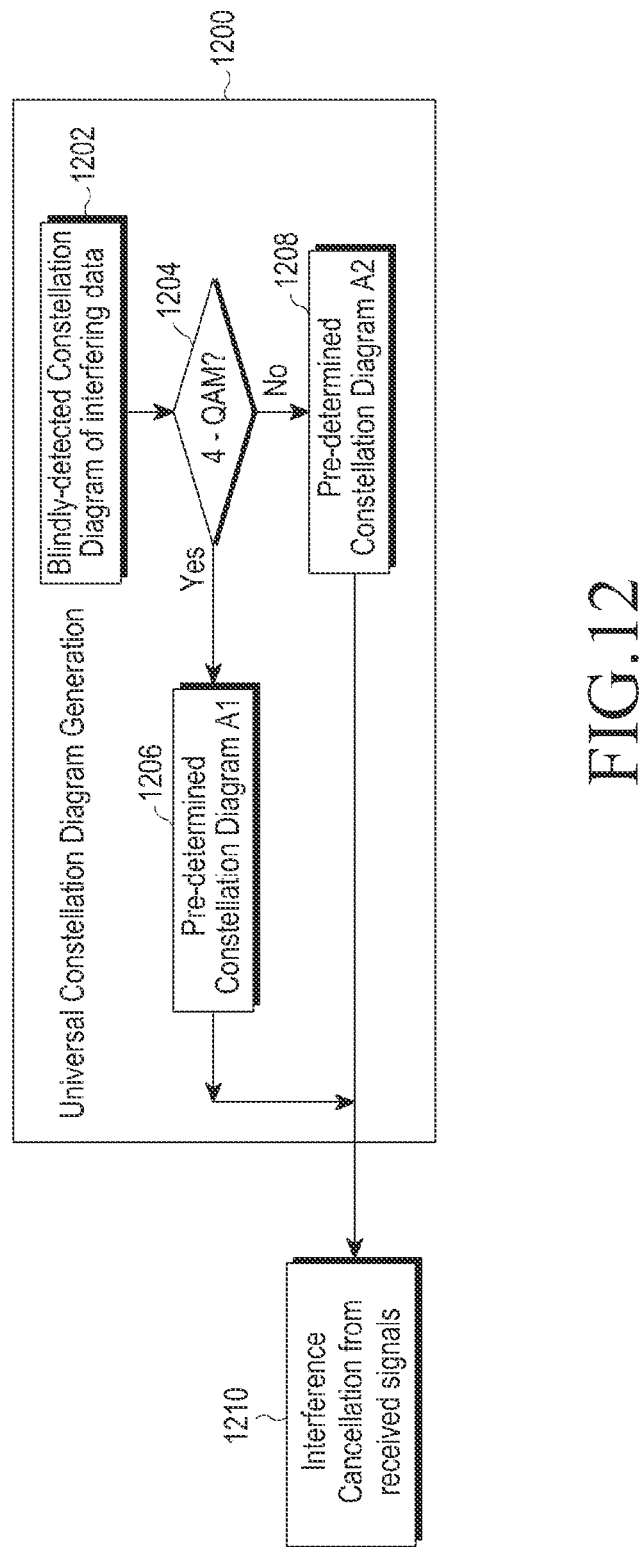
FIG. 12 illustrates an example of an interference cancellation method using a universal constellation diagram according to an embodiment of the present disclosure.

FIG. 12 illustrates an example of an interference cancellation method using a universal constellation diagram according to an embodiment of the present disclosure.

Referring to FIGS. 9 and 12, in step 1200, a UE generates a universal constellation diagram (in operation 900) by determining a universal constellation diagram to be used among a plurality of predefined constellation diagrams, rather than through an operation of actually generating the universal constellation diagram.

Specifically, the UE blindly detects a constellation diagram of the interference data in step 1202, to determine a modulation scheme and a modulation level of the interference data. The UE checks, in step 1204, whether the determined modulation scheme and modulation level of the interference data correspond to 4QAM, and determines universal constellation diagrams A1 and A2 for interference cancellation in steps 1206 and 1208.

More specifically, in step 1204, the UE checks whether the modulation scheme of the interference data is 4QAM. If the modulation scheme of the interference data is 4QAM, the UE uses a predefined constellation diagram A1 in step 1206. However, if the modulation scheme of the interference data is not 4QAM, the UE uses a predefined constellation diagram A2 in step 1208. In step 1210, the UE performs interference cancellation from the received signal using the determined universal constellation diagram.

In the foregoing description, it is assumed that the interference parameters RI and PMI are known to the UE through RRC signaling or DCI. However, as described above, the interference parameters RI and PMI may cause the network signaling overhead. Therefore, in accordance with an embodiment of the present disclosure, a method is provided for the case where signaling is not available.

Figure 13:
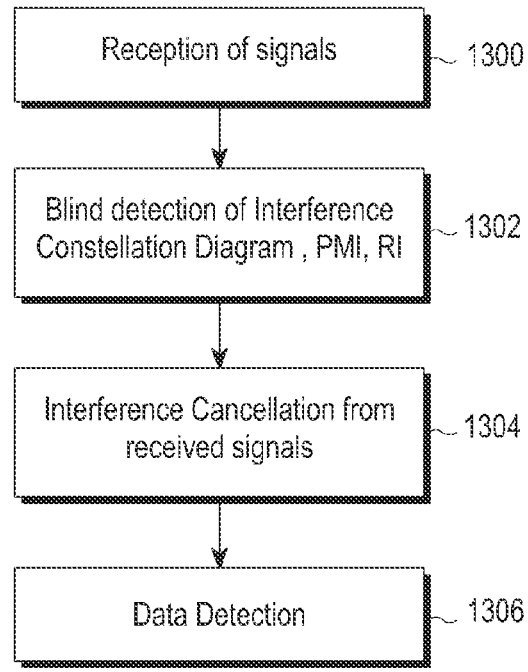
FIG. 13 illustrates a method of cancelling interference by blindly detecting an interference constellation diagram, a PMI, and an RI according to an embodiment of the present disclosure.

FIG. 13 illustrates a method of cancelling interference by blindly detecting an interference constellation diagram, a PMI, and an RI according to an embodiment of the present disclosure.

Referring to FIG. 13, in step 1300, a UE receives a downlink signal.

In step 1302, the UE blindly detects an interference constellation diagram and interference parameters RI and PMI.

In step 1304, the UE cancels an interference signal from the received signal using the blindly-detected constellation diagram and interference parameters RI and PMI.

In step 1306, the UE receives data.

Specifically, algorithms for blind detection of an RI, a PMI and a modulation level will be presented. It should be noted that these algorithms should jointly consider the three interference parameters RI, PMI and modulation level, which may cause a huge search space for ML detection.

Since the interference parameters (e.g., RI, PMI and modulation level) are not known, the model of Equation (1) may be generalized in view of these interference parameters. A channel model at a subcarrier k from a BS_i to a desired UE is defined as an Nr-by-Nt (or Nr×Nt) channel matrix $G_k^i$.

Items m and n of the channel matrix represent path gain from an antenna 'n' of the BS_i to an antenna 'm' of the UE. The items may be modeled as zero mean and unit variance (e.g., independent complex Gaussian random variables having Rayleigh fading).

Further, $P_k^i$ is defined as an $N_t$-by-$l_i$ (or $N_t \times l_i$) precoding matrix that is used in a subcarrier k by the BS_i. By representing $H_k^i = G_k^i P_k^i$, Equation (1) may be rewritten as shown in Equation (16).

$$r_k = G_k^S P_k^S x_k^S + G_k^I P_k^I x_k^I = n_k. \quad (16)$$

More specifically, a precoding matrix $P_k^I$ with RI=l and PMI=p is represented by $P_k^{I,l,p}$, and for convenience of notation, the index I is omitted from $l_I$.

If the conditional pdf $p(r_k | x_k^S, x_k^I, P_k^{I,l,p})$ is defined as $$p(r_k \mid x_k^S, x_k^I, P_k^{I,l,p}) = \exp\left(-\frac{\|r_k - H_k^S x_k^S - G_k^I P_k^{I,l,p} x_k^I\|^2}{\sigma_n^2}\right),$$

the optimal ML decision metric for l, p and q may be obtained using Equation (17).

$$\mathcal{M}_{l,p,q} = \prod_{k=1}^{K} \frac{1}{|\mathcal{X}^S|} \sum_{x_k^S \in \mathcal{X}^S} \frac{1}{|\mathcal{X}_{l,q}^I|} \sum_{x_k^I \in \mathcal{X}_{l,q}^I} p(r_k \mid x_k^S, x_k^I, P_k^{I,l,p}), \quad (17)$$

In Equation (17), $\chi_{l,q}^I$ corresponds to $\chi^i$, which is obtained as an l-fold Cartesian product of $Q_{q\,q}$.

In this case, the ML decision rule for l, p and q may be expressed as shown in Equation (18).

$$(l^{opt}, p^{opt}, q^{opt}) = \underset{l \in S^l(N_t), p \in S^p(N_t, l), q \in \{4, 16, 64\}}{\arg\max} \mathcal{M}_{l,p,q}, \quad (18)$$

In Equation (18), $S^l(N_t)$ and $S^p(N_t, l)$ represent all possible values for RI l and PMI p given as a function of $N_t$ and $\{N_r, l\}$, respectively. For example, a PMI set may be given as $S^p(N_t, l) = \{1, 2, 3, 4\}$ for $N_t = 2$ and $l = 1$.

In accordance with the way similar to the derivation of Equation (8), the approximate metric may be calculated as shown in Equations (19) and (20).

$$\mathcal{M}_{l,p,q} \approx \sum_{k=1}^{K} \left( -\frac{1}{\sigma_n^2} \|r_k - H_k^S \hat{x}_k^S - G_k^I P_k^{I,l,p} \hat{x}_k^I\|^2 \right) - K \ln(|\mathcal{X}^S||\mathcal{X}_{l,q}^I|), \quad (19)$$

$$(\hat{x}_k^S, \hat{x}_k^I) = \arg \min_{x_k^S \in \mathcal{X}^S, x_k^I \in \mathcal{X}_{l,q}^I} \|r_k - H_k^S x_k^S - G_k^I P_k^{I,l,p} x_k^I\|^2. \quad (20)$$

The combined detection of RI, PMI and modulation level may lead to tremendous computational complexity. However, in order to reduce the dimension of the search space, the modulation level may be decoupled from the original joint detection problem by using the proposed universal constellation diagram. That is, in order to avoid the brute-force joint detection of the tremendous computational complexity, the universal constellation diagrams may be applied.

A simple way is to detect an RI and a PMI, assuming a universal constellation diagram for interference modulation, in order to decouple the modulation level detection from the combined detection of the RI and the PMI.

Figure 14:
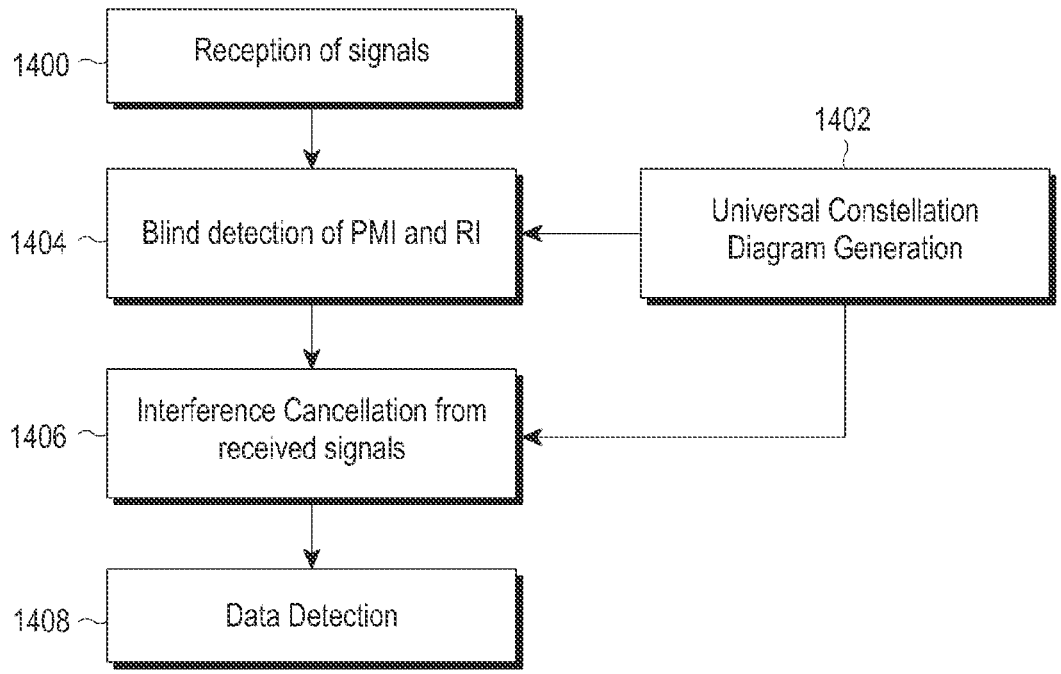
FIG. 14 illustrates an interference cancellation method based on blind detection of a PMI and an RI using a universal constellation diagram according to an embodiment of the present disclosure.

FIG. 14 illustrates an interference cancellation method based on blind detection of a PMI and an RI using a universal constellation diagram according to an embodiment of the present disclosure.

Referring to FIG. 14, in step 1400, a UE receives a downlink signal, for example, a PDSCH.

In step 1402, the UE selectively generates a universal constellation diagram, or determines a universal constellation diagram to be used among the predefined universal constellation diagrams. For example, the UE may determine a universal constellation diagram based on at least one of a modulation scheme and a modulation level of the serving data (or the desired signal).

In step 1404, the UE blindly detects an RI and a PMI using the universal constellation diagram.

In step 1406, the UE cancels an interference signal from the received signal using the RI and PMI assuming the universal constellation diagram as a constellation diagram for interference modulation.

In step 1408, the UE receives data.

The decision metric obtained by assuming the universal constellation diagram for interference modulation may be expressed as shown Equation (21).

$$M_{l,p} = \prod_{k=1}^{K} \frac{1}{|X^S|} \sum_{x_k^S \in X^S} \frac{1}{|X_{l,u}^I|} \sum_{x_k^I \in X_{l,u}^I} p(r_k | x_k^S, x_k^I, P_k^{l,L,p}), \quad (21)$$

In Equation (21), $\chi_{i,u}^I$ corresponds to $\chi_{i,q}^I$ having an interference constellation diagram that is fixed as $C^I{}^I = U$.

In this case, the decision rule may be expressed as shown in Equation (22).

$$(l^{opt}, p^{opt}) = \underset{l \in S^l(N_t), p \in S^p(N_t, l)}{\mathrm{argmax}} \; M_{l,p}. \quad (22)$$

Equations (23) and (24) may be obtained as the max-log approximation.

$$M_{l,p} \approx \sum_{k=1}^{K} \left( -\frac{1}{\sigma_n^2} \left\| r_k - H_k^S \hat{x}_k^S - G_k^I P_k^{l,L,p} \hat{x}_k^I \right\|^2 \right) - K \ln(|X^S||X_{l,u}^I|), \quad (23)$$

$$(\hat{x}_k^S, \hat{x}_k^I) = \underset{x_k^S \in X^S, x_k^I \in X_{l,u}^I}{\arg \min} \left\| r_k - H_k^S x_k^S - G_k^I P_k^{l,L,p} x_k^I \right\|^2. \quad (24)$$

Alternatively, the UE may further perform a process of continuously blindly detecting an interference constellation diagram, without assuming a constellation diagram for interference modulation as a universal constellation diagram.

Figure 15:
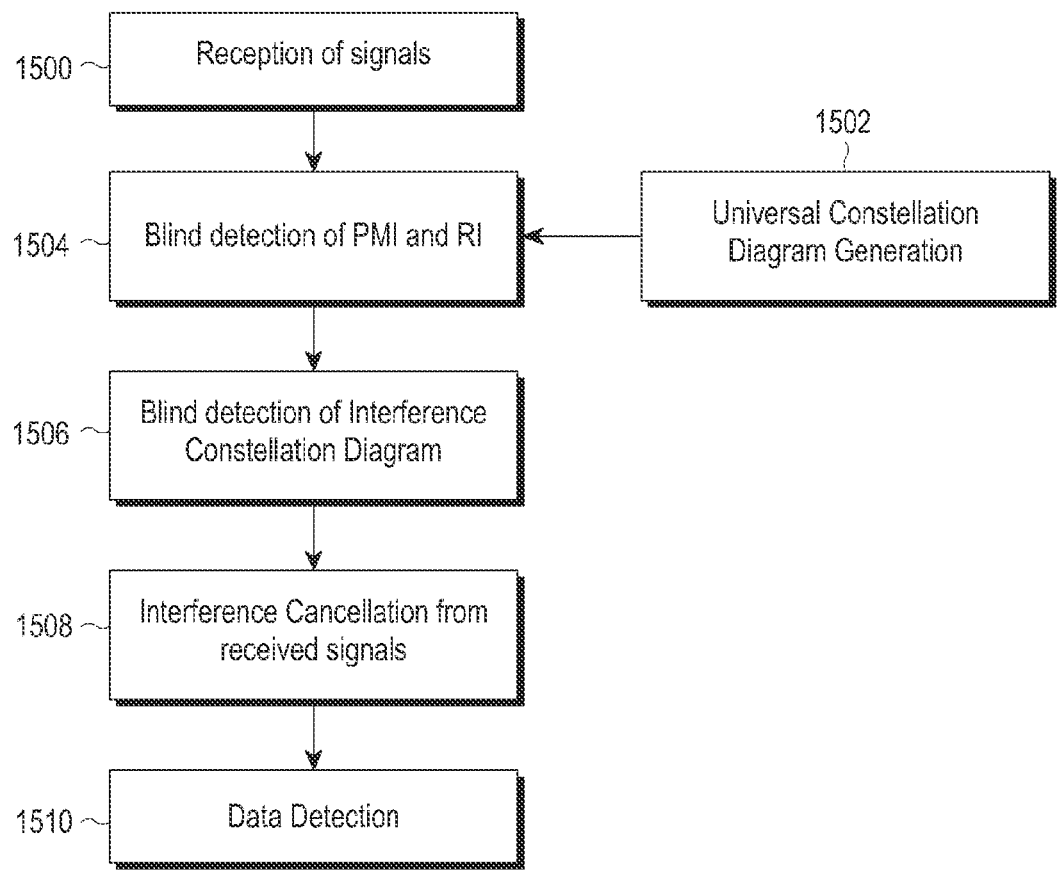
FIG. 15 illustrates an interference cancellation method based on blind detection of a PMI and an RI using a universal constellation diagram and continuous blind detection of an interference constellation diagram according to an embodiment of the present disclosure.

FIG. 15 illustrates an interference cancellation method based on blind detection of a PMI and an RI using a universal constellation diagram and continuous blind detection of an interference constellation diagram, according to an embodiment of the present disclosure.

In step 1500, a UE receives a downlink signal.

In step 1502, the UE selectively generates a universal constellation diagram, or determines a universal constellation diagram to be used among the predefined universal constellation diagrams.

In step 1504, the UE blindly detects an RI and a PMI using the universal constellation diagram.

In step 1506, the UE performs the blind detection for interference modulation, without assuming the universal constellation diagram as a constellation diagram for interference modulation. For example, the blind detection of the interference modulation in step 1506 may be performed using operation 402 in FIG. 4, Equation (5), Equation (8) or Equation (11).

In step 1508, the UE cancels an interference signal from the received signal using the blindly-detected RI, PMI and interference modulation constellation diagram.

In step 1510, the UE receives data.

Figure 16:
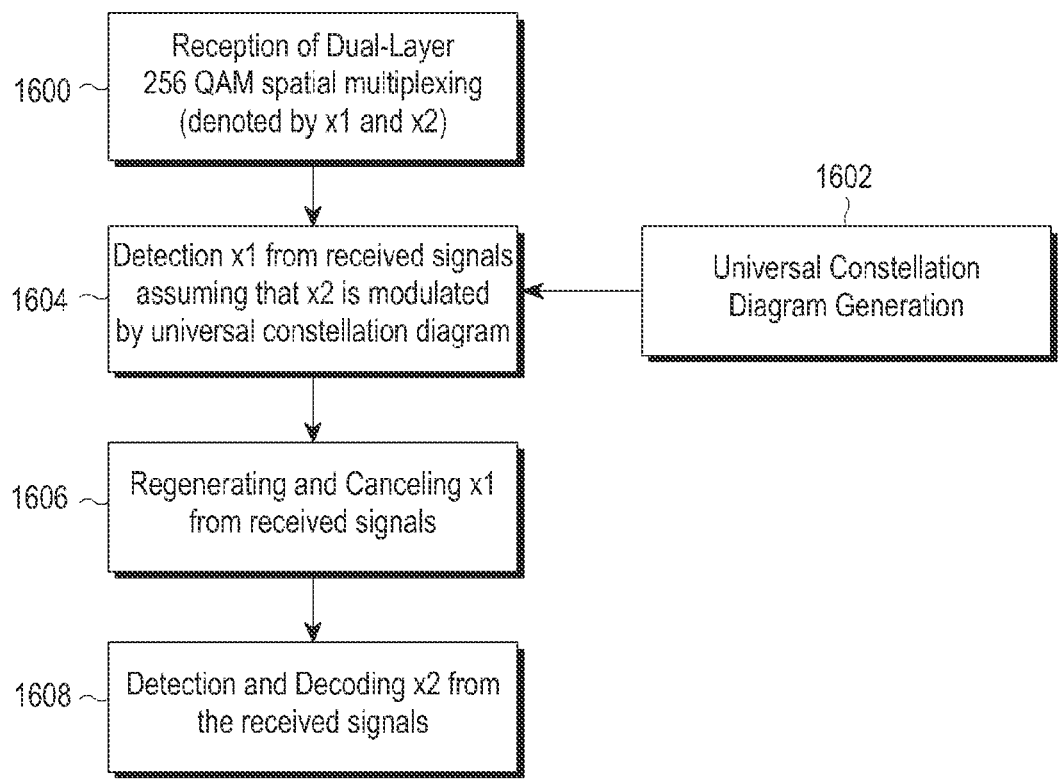
FIG. 16 illustrates a method of using a universal constellation diagram in a UE that receives two data streams with spatial multiplexing transmission according to an embodiment of the present disclosure.

FIG. 16 illustrates a method of using a universal constellation diagram in a UE that receives two data streams with spatial multiplexing transmission according to an embodiment of the present disclosure.

Although various embodiments of the present disclosure have been described above with reference to the inter-cell interference environments, the same techniques may also be applied to an interference environment between multiple users in a cell, or an interference environment between multiple data streams of a single user. Assuming that a UE receives two data streams that are modulated by 256QAM through spatial multiplexing transmission, an operation, in which the UE detects and decodes the two data streams modulated by 256QAM, may require a high computational complexity (that is difficult to implement) from the UE. A technique of using the universal constellation diagram in accordance with an embodiment of the present disclosure may be applied in drastically reducing the complexity of Iterative Detection and Decoding (IDD) of the UE. An example of a method of receiving multiple data streams in a UE will be described below in detail with reference to FIG. 16.

Referring to FIG. 16, in step 1600, the UE receives two signals that are modulated by 256QAM through two spatial layers to which spatial multiplexing is applied. For example, the two signals are expressed as a first signal x1 and a second signal x2.

In step 1602, the UE selectively generates a universal constellation diagram. Alternatively, the UE may determine a pre-generated constellation diagram as the universal constellation diagram, rather than generating the universal constellation diagram.

Assuming that the second signal x2 is modulated by a 16-point universal constellation diagram, the UE may determine the 16-point universal constellation diagram as a constellation diagram of the second signal x2.

In step 1604, the UE detects the first signal x1 by calculating an LLR value of the first signal x1 using the constellation diagram of the second signal x2. Consequently, the UE may significantly reduce the complexity of computation required during its data reception.

In step 1606, the UE regenerates the first signal x1 using the LLR value, and cancels the first signal x1 from the signals received in step 1600. Accordingly, the UE may cancel the intra-cell interference by cancelling the first signal x1, which may act as interference to the second signal x2.

In step 1608, the UE detects and decodes the second signal x2, using the received signals from which the first signal x1 is cancelled.

Figure 17:
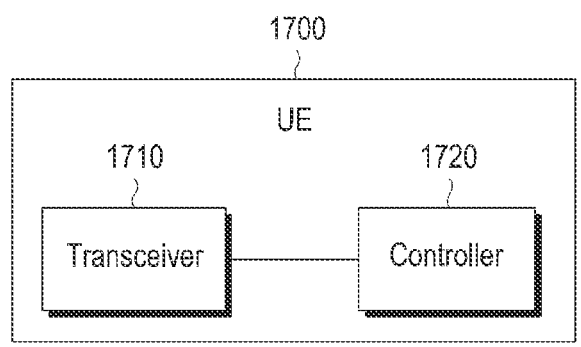
FIG. 17 illustrates a structure of a UE device that implements an interference cancellation method according to an embodiment of the present disclosure according to an embodiment of the present disclosure.

FIG. 17 illustrates a structure of a UE device according to an embodiment of the present disclosure.

Referring to FIG. 17, the UE device 1700 includes a transceiver 1710 that can exchange signals with a BS or another UE, and a controller 1720 for controlling the transceiver 1710. Alternatively, the transceiver 1710 and the controller 1720 may be implemented as a single device.

The controller 1720 implements an operation of the UE device 1700. A detector, an ML receiver, an IC receiver, an estimator, etc., which are described above, may all be controlled by the controller 1720. Accordingly, it can be understood that all operations regarding an interference cancellation method by a UE and a multi-data stream reception method based on spatial multiplexing, which are described herein, are implemented by the controller 1720.

The configuration of the system, the example of the interference cancellation method, the example of the constellation diagram, and the structure of the UE device, which are illustrated in FIGS. 1 to 17, are not intended to limit the scope of the present disclosure. In other words, all of the specific constellation diagrams, the components or the operations, which are described in FIGS. 1 to 17, should not be construed as required components of the present disclosure, and the present disclosure may be implemented only with some of the components without undermining the essence of the present disclosure.

The above-described operations may be implemented by mounting a memory device storing the relevant program code in any component in a BS or UE device of the communication system. That is, a controller of the BS or UE device may perform the above-described operations by reading out and executing the program code stored in the memory device by means of a processor or a Central Processing Unit (CPU).

Various components and modules of the BS or UE device, which are described therein, may be operated using a hardware circuit (e.g., a Complementary Metal Oxide Semiconductor (CMOS)-based logic circuit), firmware, software, and/or a hardware circuit such as a combination of hardware, firmware and/or software inserted into a machine-readable medium. For example, various electrical structures and methods may be implemented using electrical circuits such as transistors, logic gates and Application Specific Integrated Circuits (ASICs).

As is apparent from the foregoing description, a low-complexity scheme for efficiently cancelling interference, without the knowledge of the interference modulation level, is provided.

According to an embodiment of the present disclosure, it is possible to cancel interference from received signals using a universal constellation diagram in the NAICS system supporting various schemes such as full network assistance, semi-blind detection, and full-blind detection.

For example, it is possible to use known transmission parameters of an interference signal to generate a universal constellation diagram from a plurality of predefined constellation diagrams.

In addition, by using the proposed universal constellation diagrams, it is possible to avoid the brute-force joint detection for any set of an RI, a PMI and a modulation level, which are dynamic interference parameters, and to decouple modulation detection from the combined detection of the RI and the PMI, enabling the NAICS based on the blind detection of the interference parameters to have high performance and low complexity.

Further, by using the proposed universal constellation diagrams, it is possible to significantly reduce the computational complexity of the UE and obtain high performance in receiving multiple data streams through spatial multiplexing.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for canceling interference by a User Equipment (UE) in a cellular communication system, the method comprising:
receiving a signal including a desired signal and an interference signal from at least one base station;
generating at least one predefined constellation diagram;
determining a universal constellation diagram from the at least one predefined constellation diagram based on at least one of a transmission parameter of the desired signal and a transmission parameter of the interference signal;
blindly detecting an additional transmission parameter of the interference signal using the determined universal constellation diagram; and
cancelling the interference signal from the received signal using the detected additional transmission parameter,
wherein the at least one predefined constellation diagram is generated by:
selecting at least one constellation point from constellation points on one or more constellation diagrams; and
distorting or deviating the selected at least one constellation point in view of a Euclidean distance.

2. The method of claim 1, wherein the one or more constellation diagrams include a Quadrature Amplitude Modulation (QAM) constellation diagram, a Pulse-Amplitude Modulation (PAM) constellation diagram and a Phase Shift Keying (PSK) constellation diagram.

3. The method of claim 1, wherein the received signal includes at least one of a Physical Downlink Shared Channel (PDSCH) and a Physical Multicast Channel (PMCH).

4. The method of claim 1, wherein the at least one of the transmission parameter of the desired signal and the transmission parameter of the interference signal includes at least one of a modulation scheme and a modulation level.

5. The method of claim 4, wherein the modulation scheme includes at least one of a Quadrature Amplitude Modulation (QAM), a Pulse-Amplitude Modulation (PAM), and a Phase Shift Keying (PSK), and
wherein the modulation level is at least one of 4, 16, 64, and 256.

6. The method of claim 1, wherein the at least one of the transmission parameter of the desired signal and the transmission parameter of the interference signal includes a Rank Indicator (RI).

7. The method of claim 1, wherein the additional transmission parameter includes a Rank Indicator (RI) and a Precoding Matrix Indicator (PMI).

8. The method of claim 7, wherein the determined universal constellation diagram is utilized as a constellation diagram for modulation of the interference signal.

9. The method of claim 7, further comprising blindly detecting at least one of a modulation scheme and a modulation level of the interference signal using the RI and the PMI.

10. The method of claim 1, wherein the UE uses a plurality of antennas to transmit and receive a signal in a Multiple-Input-Multiple-Output (MIMO) link.

11. The method of claim 1, wherein the signal is received using Orthogonal Frequency Division Multiplexing (OFDM) scheme.

12. A User Equipment (UE) device for performing interference cancellation in a cellular communication system, the UE device comprising:

a transceiver configured to receive a signal including a desired signal and an interference signal from at least one base station; and
a controller configured to:
generate at least one predefined constellation diagram;
determine a universal constellation diagram from the at least one predefined constellation diagram based on at least one of a transmission parameter of the desired signal and a transmission parameter of the interference signal;
blindly detect an additional transmission parameter of the interference signal using the determined universal constellation diagram; and
cancel the interference signal from the received signal using the detected additional transmission parameter,
wherein the at least one predefined constellation diagram is generated by:
selecting at least one constellation point from constellation points on one or more constellation diagrams; and
distorting or deviating the selected at least one constellation point in view of a Euclidean distance.

13. The UE device of claim 12, wherein the one or more constellation diagrams include a Quadrature Amplitude Modulation (QAM) constellation diagram, a Pulse-Amplitude Modulation (PAM) constellation diagram and a Phase Shift Keying (PSK constellation diagram.

14. The UE device of claim 12, wherein the received signal includes at least one of a Physical Downlink Shared Channel (PDSCH) and a Physical Multicast Channel (PMCH).

15. The UE device of claim 12, wherein the at least one of the transmission parameter of the desired signal and the transmission parameter of the interference signal includes at least one of a modulation scheme and a modulation level.

16. The UE device of claim 15, wherein the modulation scheme includes at least one of a Quadrature Amplitude Modulation (QAM), a Pulse-Amplitude Modulation (PAM), and a Phase Shift Keying (PSK), and
wherein the modulation level is at least one of 4, 16, 64, and 256.

17. The UE device of claim 12, wherein the at least one of the transmission parameter of the desired signal and the transmission parameter of the interference signal includes a Rank Indicator (RI).

18. The UE device of claim 12, wherein the additional transmission parameter includes a Rank Indicator (RI) and a Precoding Matrix Indicator (PMI).

19. The UE device of claim 18, wherein the controller utilizes the determined universal constellation diagram as a constellation diagram for modulation of the interference signal.

20. The UE device of claim 18, wherein the controller is further configured to blindly detect at least one of a modulation scheme and a modulation level of the interference signal using the RI and PMI.

21. The UE device of claim 12, further comprising a plurality of antennas to receive a signal in a Multiple-Input-Multiple-Output (MIMO) link.

22. The UE device of claim 12, wherein the transceiver is further configured to receive the signal by Orthogonal Frequency Division Multiplexing (OFDM) scheme.

23. A method for receiving a signal by a User Equipment (UE) in a cellular communication system, the method comprising:
receiving, from a base station, a spatially-multiplexed signal including a first layer data stream and a second layer data stream;
generating at least one predefined constellation diagram;
determining a universal constellation diagram to be used as a constellation diagram of the second layer data stream from the at least one predefined constellation diagram based on a transmission parameter of the second layer data stream; and
detecting the first layer data stream using the constellation diagram of the second layer data stream,
wherein the at least one predefined constellation diagram is generated by:
selecting at least one constellation point from constellation points on one or more constellation diagrams; and
distorting or deviating the selected at least one constellation point in view of a Euclidean distance.

24. The method of claim 23, wherein the transmission parameter of the second layer data stream includes at least one of a modulation scheme and a modulation level.

25. The method of claim 24, wherein the modulation scheme includes at least one of a Quadrature Amplitude Modulation (QAM), a Pulse-Amplitude Modulation (PAM), and a Phase Shift Keying (PSK), and
wherein the modulation level is at least one of 4, 16, 64, and 256.

26. The method of claim 25, wherein the second layer data stream included in the received signal is modulated by 256QAM, and
wherein the determined universal constellation diagram is a 16-point constellation diagram.

27. The method of claim 23, further comprising:
regenerating the first layer data stream;
cancelling the first layer data stream from the received signal; and
detecting and decoding the second layer data stream using the received signal from which the first layer data stream is cancelled.

28. A User Equipment (UE) device for receiving a signal in a cellular communication system, the UE device comprising:
a transceiver which receives a spatially-multiplexed signal, including a first layer data stream and a second layer data stream, from a base station; and
a controller configured to:
generate at least one predefined constellation diagram;
determine a universal constellation diagram to be used as a constellation diagram of the second layer data stream, from the at least one predefined constellation diagram based on a transmission parameter of the second layer data stream; and
detect the first layer data stream using the constellation diagram of the second layer data stream,
wherein the at least one predefined constellation diagram is generated by:
selecting at least one constellation point from constellation points on one or more constellation diagrams; and
distorting or deviating the selected at least one constellation point in view of a Euclidean distance.

29. The UE device of claim 28, wherein the transmission parameter of the second layer data stream includes at least one of a modulation scheme and a modulation level.

30. The UE device of claim 29, wherein the modulation scheme includes at least one of a Quadrature Amplitude Modulation (QAM), a Pulse-Amplitude Modulation (PAM), and a Phase Shift Keying (PSK); and
wherein the modulation level is at least one of 4, 16, 64 and 256.

31. The UE device of claim 30, wherein the second layer data stream included in the received signal is modulated by 256QAM, and
    wherein the determined universal constellation diagram is a 16-point constellation diagram.

32. The UE device of claim 28, wherein the controller: regenerates the first layer data stream; cancels the regenerated first layer data stream from the received signal; and detects and decodes the second layer data stream using the received signal from which the first layer data stream is cancelled.

* * * * *